No. 839,028. PATENTED DEC. 18, 1906.
S. L. PORTER.
BELT STRETCHER.
APPLICATION FILED JULY 31, 1905.
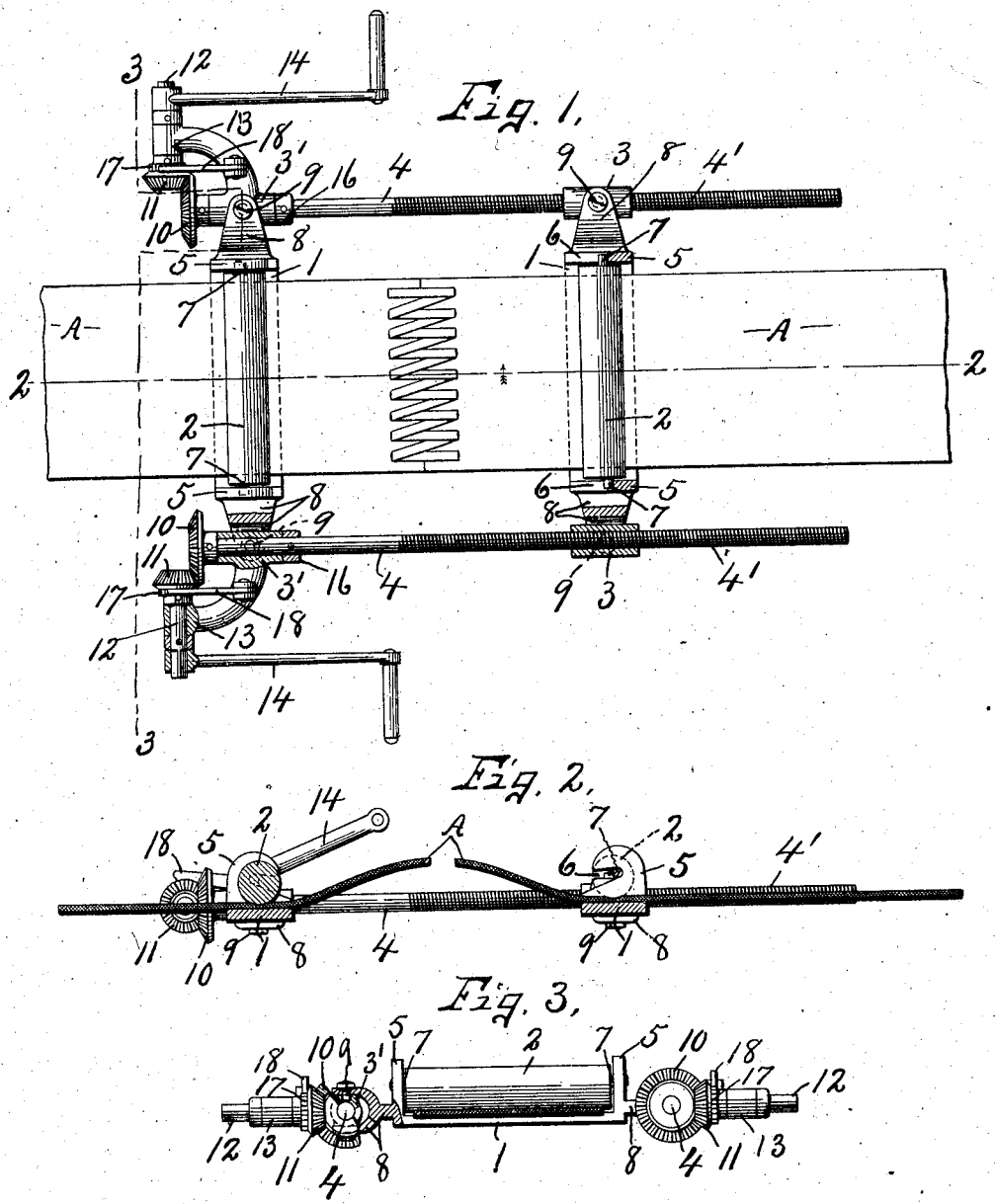
WITNESSES:
INVENTOR:
Sherwood L. Porter
BY
Howard P. Drisdow
ATTORNEY.

UNITED STATES PATENT OFFICE.

SHERWOOD L. PORTER, OF DELPHI FALLS, NEW YORK.

BELT-STRETCHER.

No. 839,028.　　　Specification of Letters Patent.　　　Patented Dec. 18, 1906.

Application filed July 31, 1905. Serial No. 271,984.

*To all whom it may concern:*

Be it known that I, SHERWOOD L. PORTER, of Delphi Falls, in the county of Onondaga, in the State of New York, have invented new and useful Improvements in Belt-Stretchers, of which the following, taken in connection with the accompanying drawings, is a full, clear, and exact description.

This invention relates to improvements in belt-stretchers in which the primary object is to take up the slack and to firmly hold the ends of the belt while relacing.

The specific object of my invention is to grip the ends of the belt with an eccentric rolling action, in which the eccentric rollers are mounted in open-sided bearings and coact with underlying bed-plates or abutments to grip the belt with increasing pressure as the belt is tightened and to allow the eccentric rollers to withdraw from their open-sided bearings when the grip of the rollers is loosened, whereby the whole device may be readily detached or dropped away from the belt, leaving the rollers free from the bearings or frame upon which they may have been mounted while in action.

A further object is to connect the ends of the roller-supporting frame to suitable nuts or threaded heads, which are engaged by independently-rotatable screws at opposite sides of the belt and to flexibly join or hinge said nuts to the adjacent ends of their respective supports, so that the independent action of the screws may operate to stretch or tighten one side of the belt more than the other if this is found to be necessary in truing up the belt.

Other objects and uses relating to the specific structure of the various parts of the device will be brought out in the following description.

In the drawings, Figure 1 is a top plan of my improved belt-stretching device and a belt to which it is applied. Figs. 2 and 3 are longitudinal and transverse sectional views taken, respectively, on lines 2 2 and 3 3, Fig. 1, except that in Fig. 2 the meeting ends of the belt are separated as before lacing.

A represents a belt to which my improved belt-stretching device is applied, said belt being shown as having its meeting ends properly cut and laced in Fig. 1 and as in the act of being stretched or taken up in Fig. 2. This belt-stretching device comprises, essentially, a pair of similar transverse bars or bed-pieces 1; a pair of eccentric gripping-rollers 2, one for each of the bars 1; threaded nuts or heads 3, hinged to the ends of one of the bars 1; additional heads 3', hinged to the ends of the other bar 1, and separate rotary shafts 4, journaled in the heads 3' and provided with threaded portions or screws 4', which engage the threaded apertures of the nuts 3, and means, presently described, for rotating the screw-shaft 4, separately or simultaneously, whereby the bars 1 may be moved toward and from each other.

The bars 1 are spaced a greater or less distance apart lengthwise of the belt to which they are to be applied and are each provided with a pair of ears 5 near its ends, said ears being formed with open-sided bearings or slots 6 for the reception of the reduced ends or pivotal pins 7 of the eccentric rollers 2, the distance between the ears 5 of each bar being substantially the same and sufficient to receive between them any width of belt which it may be necessary to tighten or stretch.

When the device is applied to a belt, as seen in Figs. 1 and 2, the bars 1 extend transversely across the back of the belt in nearly parallel lines, forming a back support for the ends of the belt, while the ears 5 project upwardly or forwardly at the edges of the belt some distance beyond the plane of its outer face, and the slots or open-sided bearings 6 are located in the ears beyond the front face of the belt, so that the open sides of one bar face the open sides of the slots in the other bar.

The rollers 2 are of substantially the same length as their supporting-bars 1, or rather as the distance between the ears 5, and are inserted from adjacent sides of the bars into the open sides of their respective bearings, which receive the eccentric-pins or reduced ends 7 of the rollers. As best seen in Fig. 2, these rollers are set with their longer radii facing each other, so that the preponderance of weight or eccentricity is at the inside of the axes of the rollers to cause them to fall automatically by gravity into contact with the adjacent face of the belt which may be interposed between the rollers 2 and transverse bars 1.

The longer radius of each roller is slightly greater than the distance in a direct line between the swinging axis and adjacent face of the transverse bar 1, thereby insuring a positive grip, which increases with the pull upon the belt.

I have found that the efficiency of the gripping power of smooth wood rollers, as hard wood, is entirely satisfactory; but in some instances I may prefer to make the rollers of metal, either hollow or solid, and, if necessary, to corrugate or knurl the periphery.

The opposite ends of each bar 1 are provided with ears 8, projecting beyond the upwardly-projecting bearings 5, and are pivoted at 9 to their respective heads 3 and 3' upon the shaft 4. It therefore follows that the screw-shafts 4 are held in parallelism at opposite sides of and extending along the longitudinal edges of the belt at the outside of the bearings 5.

Each screw-shaft 4 is rotated by separate driving means, which in this instance consists of intermeshing gears 10 and 11, the gear 10 being secured to one end of its shaft 4 at the outer end of the bearing or head 3', and the gear 11 is rigidly secured to a comparatively short transverse shaft 12, which is journaled in an arm or bracket 13 and is rotated by means of a hand lever or crank 14 for transmitting rotary motion to its screw 4 through the medium of the gears 10 and 11, which in turn cause the transverse bars 1 and their gripping-rollers 2 to be moved toward and from each other in the act of taking up and holding the meeting ends of the belt while being cut and relaced or fastened.

The hub of the gear 10 engages the outer face of its bearing 3' to prevent the shaft 4 from moving endwise in one direction, said shaft being provided with a collar 16 rigid thereon, which engages the inner end of the bearing 3' to prevent endwise movement of the shaft in the opposite direction, it being understood, of course, that this endwise movement mentioned refers to the relative axial movement of the shaft with reference to the bearing 3', in which it is journaled.

One of the shafts or rotating parts, in this instance the shaft 12, is provided with a toothed circular rack 17, which is engaged by a gravity-pawl 18 to prevent retrograde movement or rotation of the screws and clamping-heads to which they are connected during the operation of tightening or stretching the belt. This operation is as follows: The eccentric rollers 2 are first removed from their open-sided bearings, whereupon the whole frame or belt-stretching device is placed at the back of the belt and brought forward with one of the clamping-bars 1 at each side of the meeting ends of portion of the belt which is to be cut away, and as soon as this is done the eccentric rollers are placed in their respective bearings in the manner seen in Fig. 2 and automatically dropped or may be turned by hand into gripping engagement with the belt—that is, so as to impinge the belt between the eccentric-roller face and its underlying bar 1. Under ordinary conditions when the belt is not unduly stretched more on one side than on the other the bars 1 are placed against the belt in substantially parallel lines, and therefore their respective rollers 2 are parallel; but if one side should happen to be stretched more than the other the shorter side may be drawn up more tightly or stretched more than the other side by operating the screw on that side independently of the other screw. This independent movement of the screws is particularly advantageous to bring the meeting ends of the belt after being squared and cut close together and parallel, so that the operation of lacing or otherwise fastening the abutting ends together is greatly facilitated. In the drawings I have shown both shafts as provided with right-hand screws and both of the gears 11 at the outer side of the axes of the gears 10, with which they intermesh, and therefore in the operation of tightening or stretching the belt the crank-arms 14 would have to be rotated in opposite directions; but it is evident that one of the screws may be left hand or one of the gears 11 may be connected to the inside of the axis of its gear 10, in which case the gripping devices, as the bar 1 and its roller 2, would be drawn together by the rotation of the crank 14 in the same direction. After the belt has been properly stretched, cut, and relaced the screw-shafts 4 are rotated to separate the heads 3 and 3' and gripping devices, as the bars 1 and their eccentrics 2, thereby releasing the eccentric rollers by rocking their gripping-faces upwardly or away from the belt, whereupon they either are displaced automatically or may be removed by hand from their open-sided bearings, allowing the remaining portions of the device to be readily withdrawn from the opposite side of the belt.

What I claim is—

1. In a belt-stretching device, two parallel rotary shafts spaced apart and threaded on one end, nuts engaging the threaded end of the shafts, heads in which the opposite ends of the shafts are journaled, a transverse bar having its ends pivotally connected to said nuts and provided with open-sided bearings, a roller eccentrically journaled in said bearings, a second transverse bar pivotally connected to said heads and also provided with open-sided bearings, a second roller eccentrically journaled in the open-sided bearings of the second bar and separate operating devices for rotating said shafts.

2. In a belt-stretching device a pair of parallel rotary shafts spaced apart and threaded at one end, nuts on the threaded ends of said shafts, a transverse bar having its ends pivotally connected to said nuts respectively, said bar having raised ears formed with open-sided bearings, a roller eccentrically journaled in said bearings, heads in which the opposite ends of said shafts are journaled, a second transverse bar having its opposite ends pivotally connected to said heads respectively, said second bar also having raised ears formed with open-sided bearings, a second roller eccentrically journaled in the open-sided bearings of the second bar, separate devices for rotating said shafts and means for holding said devices from retrograde movement.

3. In a belt-stretching device, a pair of oppositely-arranged non-rotatable heads, a transverse bar pivotally connected to said heads respectively, opposite parallel shafts having one end journaled in said heads and their opposite ends screw-threaded, nuts engaged with said screw-threaded ends of the shafts, a second transverse bar having its opposite ends pivotally connected to said nuts respectively, said bars having open-sided bearings, the open sides of the bearings of one bar facing the open sides of the bearings of the other bar, a pair of rollers, each eccentrically journaled in the open-sided bearings of one of the bars, brackets projecting from said heads, separate transverse shafts journaled on said brackets and each geared to one of the first-named shafts, separate operating devices for said transverse shafts and means for holding the transverse shafts against retrograde movement.

4. In a belt-stretching device a pair of oppositely-arranged heads, a transverse bar having its opposite ends pivotally connected to said heads respectively, opposite parallel shafts journaled at one end in said heads and having their opposite ends screw-threaded, nuts engaging said threaded ends of the shafts, a second transverse bar having its opposite ends pivotally connected to said nuts respectively, each transverse bar being provided with a pair of open-sided bearings, the open sides of the bearings of one bar facing the open sides of the bearings of the other bar, rollers eccentrically journaled in the open-sided bearings of one of the bars and separate devices for rotating the shafts.

In witness whereof I have hereunto set my hand this 22d day of July, 1905.

SHERWOOD L. PORTER.

Witnesses:
JAMES E. TAPNER,
T. J. PIESTER.